United States Patent
Sueda

(10) Patent No.: US 12,100,553 B2
(45) Date of Patent: Sep. 24, 2024

(54) MULTILAYER ELECTRONIC DEVICE

(71) Applicant: TDK CORPORATION, Tokyo (JP)

(72) Inventor: Yuichiro Sueda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 151 days.

(21) Appl. No.: 18/071,077

(22) Filed: Nov. 29, 2022

(65) Prior Publication Data

US 2023/0245824 A1 Aug. 3, 2023

(30) Foreign Application Priority Data

Jan. 31, 2022 (JP) .................. 2022-013248

(51) Int. Cl.
*H01G 4/12* (2006.01)
*H01G 4/30* (2006.01)

(52) U.S. Cl.
CPC ............. *H01G 4/1209* (2013.01); *H01G 4/30* (2013.01)

(58) Field of Classification Search
CPC .......... H01G 4/30; H01G 4/12; H01G 4/1209; H01G 4/1227

USPC ........................ 361/301.4, 321.1, 321.4, 311
See application file for complete search history.

(56) References Cited

U.S. PATENT DOCUMENTS

| | | | |
|---|---|---|---|
| 2012/0026642 A1* | 2/2012 | Kaneko ............... | C04B 35/4682 361/321.4 |
| 2017/0330686 A1* | 11/2017 | Sugita .................. | H01G 4/0085 |

FOREIGN PATENT DOCUMENTS

| | | |
|---|---|---|
| JP | 5251993 B2 | 7/2013 |
| JP | 5541318 B2 | 7/2014 |

* cited by examiner

*Primary Examiner* — Arun Ramaswamy
(74) *Attorney, Agent, or Firm* — Oliff PLC

(57) ABSTRACT

A multilayer electronic device, including an element body constituted by alternately laminating dielectric layers and internal electrode layers, in which: a molar ratio of MgO to $SiO_2$ in the dielectric layer is 1 to 5, a molar ratio of MgO to MnO in the dielectric layer is 5 to 13, the element body contains a segregation phase, and assuming that a total amount of MgO, NiO, MnO, $Cr_2O_3$, and $SiO_2$ in the segregation phase is 100 molar parts, an amount of MgO in the segregation phase is 63.0 to 99.5 molar parts, and an amount of MnO in the segregation phase is 0.5 to 12.6 molar parts.

12 Claims, 5 Drawing Sheets

MULTILAYER ELECTRONIC DEVICE

Figure 1:
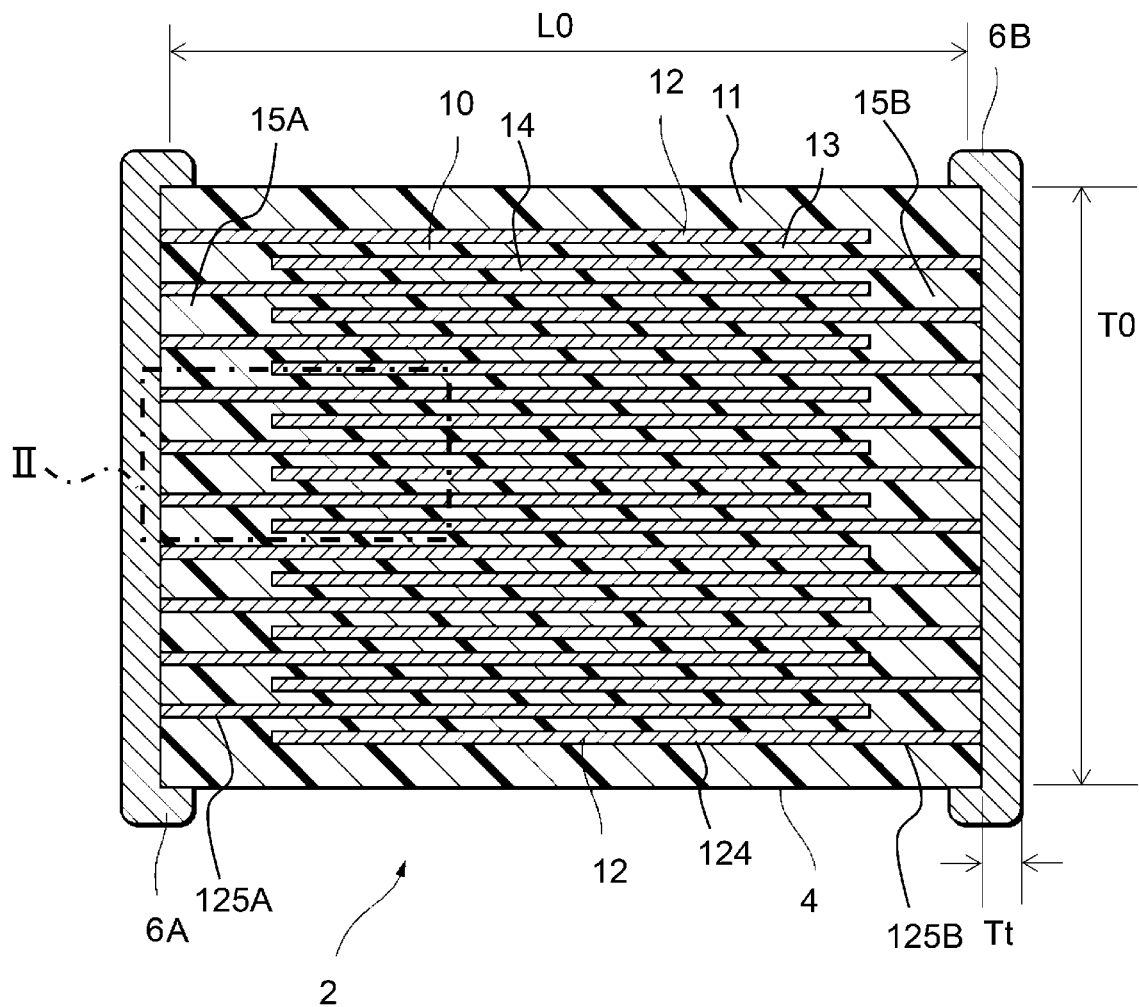

The present application claims a priority on the basis of Japanese patent application No. 2022-013248 filed on Jan. 31, 2022, which is incorporated herein by reference in its entirety.

TECHNICAL FIELD

The present invention relates to a multilayer electronic device.

BACKGROUND

Japanese Patent No. 5251993 (Patent Literature 1) discloses a multilayer electronic device for improving mechanical strength and improving reliability. In the multilayer electronic device, needle-like segregated substance containing Mg and Cr as main components is present at an interface between a dielectric layer and an internal electrode layer.

Japanese Patent No. 5541318 (Patent Literature 2) discloses a dielectric ceramic composition that exhibits good properties even when a dielectric layer is made thin, and the dielectric ceramic composition contains a predetermined amount of Mg and a predetermined amount of Mn.

SUMMARY

The present invention is made in view of the above circumstances, and an object thereof is to provide a multilayer electronic device that can improve reliability and maintain a high specific dielectric constant even when thinned.

In order to achieve the above object, the multilayer electronic device according to the present invention includes:
- an element body including alternately stacked dielectric layers and internal electrode layers, in which
- the dielectric layer contains a main component represented by a formula of $ABO_3$ and sub-components,
- A site of $ABO_3$ contains at least one selected from the group consisting of Ba, Ca and Sr,
- B site of $ABO_3$ contains at least one selected from the group consisting of Ti and Zr,
- the sub-components include $MgO$, $SiO_2$ and $MnO$,
- a molar ratio ($MgO/SiO_2$) in the dielectric layer is 1 to 5,
- a molar ratio ($MgO/MnO$) in the dielectric layer is 5 to 13,
- the element body contains a segregation phase,
- an amount of $MgO$ in the segregation phase is 63.0 to 99.5 molar parts, and
- an amount of $MnO$ in the segregation phase is 0.5 to 12.6 molar parts,
- assuming that a total amount of $MgO$, $NiO$, $MnO$, $Cr_2O_3$, and $SiO_2$ in the segregation phase is 100 molar parts.

According to the multilayer electronic device according to the present invention, reliability can be improved and a high specific dielectric constant can be maintained even when a thickness thereof is reduced. It is believed that this is because that the multilayer electronic device according to the present invention contains a segregation phase having a predetermined Mg—Mn—O-based composition.

Since the Mg—Mn—O-based segregation phase formed in the present invention has a predetermined composition, a ratio of a long grain size to a short grain size is reduced to be within a predetermined range, and a shape thereof is close to a sphere. Moreover, the long grain size can be made sufficiently shorter than a thickness of the dielectric layer. That is, the Mg—Mn—O-based segregation phase is smaller than the thickness of the dielectric layer and is dispersed in the dielectric layer. Therefore, it is possible to prevent the Mg—Mn—O-based segregation phase from bridging between one internal electrode layer and the other internal electrode layer, which are adjacent to the dielectric layer. A large number of grains can be ensured in a laminating direction of the dielectric layers. As a result, it is considered that the reliability of the multilayer electronic device according to the present invention can be improved. The reliability can be determined by ±PTV defect rate or the like.

Furthermore, according to the present application, appearance of the segregation phase can be reduced. Since the segregation phase has a low dielectric constant, by reducing the appearance of the segregation phase, a ratio of $ABO_3$ (the main component), which has a high dielectric constant, can be increased, and a specific dielectric constant of the multilayer electronic device can be increased.

In the present invention, Mg contained as an element constituting the sub-component of the dielectric layer can prevent grain growth of dielectric grains containing the main component. Accordingly, the present invention can improve the specific dielectric constant while reducing a grain size of the dielectric grains (crystal grains) containing the main component, and thus can be suitably used for thin-layer multilayer electronic devices.

For the reasons described above, according to the multilayer electronic device according to the present invention, the reliability can be improved and the high specific dielectric constant can be maintained even when the thickness thereof is reduced.

Assuming that a long grain size of the segregation phase is DL, and
a short grain size of the segregation phase is DS,
DL and DS preferably satisfy a relation of $1<DL/DS<2$.

Accordingly, the reliability can be further improved and a higher specific dielectric constant can be maintained even when the thickness thereof is reduced.

Assuming that a thickness of the dielectric layer is Td, and
a long grain size of the segregation phase is DL,
Td/DL is preferably greater than 1.4.

Accordingly, the reliability can be further improved and a higher specific dielectric constant can be maintained even when the thickness thereof is reduced.

Assuming that the total amount of $MgO$, $NiO$, $MnO$, $Cr_2O_3$, and $SiO_2$ in the segregation phase is 100 molar parts,
an amount of $NiO$ in the segregation phase may be 0 to 36 molar parts.

Assuming that the total amount of $MgO$, $NiO$, $MnO$, $Cr_2O_3$, and $SiO_2$ in the segregation phase is 100 molar parts,
an amount of $Cr_2O_3$ in the segregation phase may be 0 to 0.1 molar part.

Assuming that the total amount of $MgO$, $NiO$, $MnO$, $Cr_2O_3$, and $SiO_2$ in the segregation phase is 100 molar parts,
an amount of $SiO_2$ in the segregation phase may be 0 to 0.01 molar part.

Assuming that an amount of the main component in the dielectric layer is 100 molar parts,
an amount of $R_2O_3$ in the dielectric layer may be 0.4 to 2.0 molar part, and
the R may be at least one selected from the group of consisting Y, Dy, Ho and Yb.

Assuming that an amount of the main component in the dielectric layer is 100 molar parts,
an amount of $MgO$ in the dielectric layer may be 0.5 to 2.0 molar parts.

Assuming that an amount of the main component in the dielectric layer is 100 molar parts,
an amount of MnO in the dielectric layer may be 0.01 to 0.20 molar parts.
Assuming that an amount of the main component in the dielectric layer is 100 molar parts,
an amount of $SiO_2$ in the dielectric layer may be 0.18 to 2.95 molar parts.

Preferably, the segregation phase has a circle equivalent diameter (Da) of 0.12 μm to 1.0 μm.

Accordingly, the reliability can be further improved and a higher specific dielectric constant can be maintained even when the thickness thereof is reduced. When Da is within the above range, a highly accelerated life time of the multilayer electronic device can be increased and strength thereof can be improved, as compared with when Da exceeds the above range.

Preferably, S1/S2 is less than 1,
assuming that the segregation phase located in a capacitance region that contributes to capacitance is a capacitance region segregation phase,
the segregation phase located in a lead-out region that does not contribute to capacitance is a lead-out region segregation phase,
an area ratio of the capacitance region segregation phase in a predetermined range of the capacitance region is S1, and
an area ratio of the lead-out region segregation phase in a predetermined range of the lead-out region is S2.

Accordingly, the reliability can be further improved and a higher specific dielectric constant can be maintained even when the thickness thereof is reduced.

BRIEF DESCRIPTION OF THE DRAWING(S)

Figure 2:
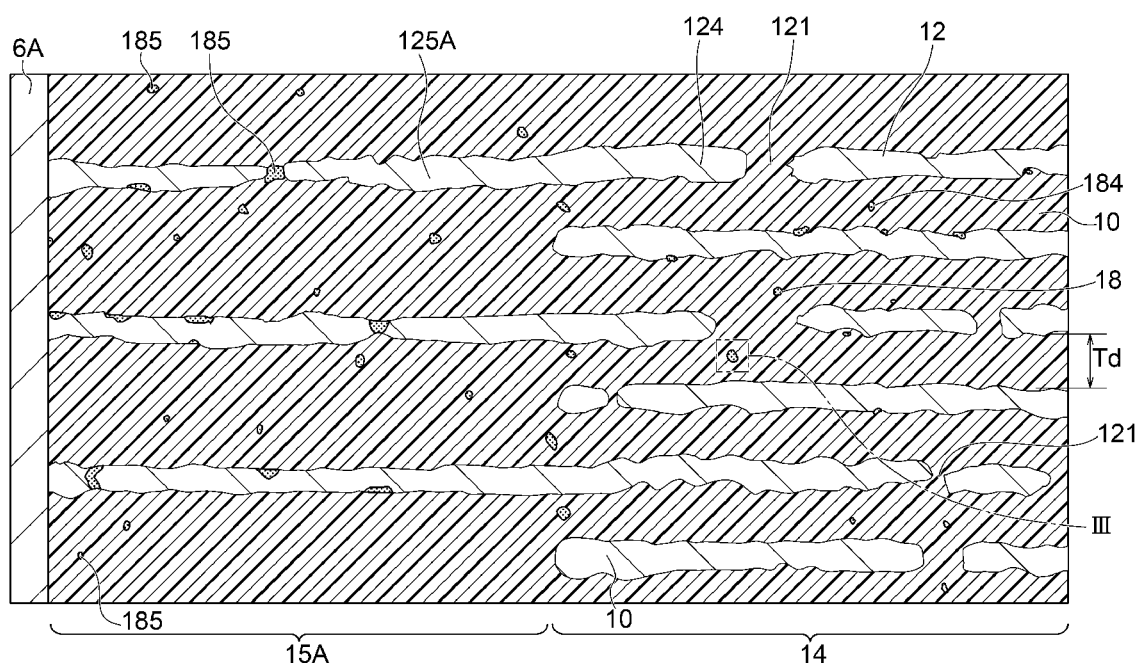
Figure 3:
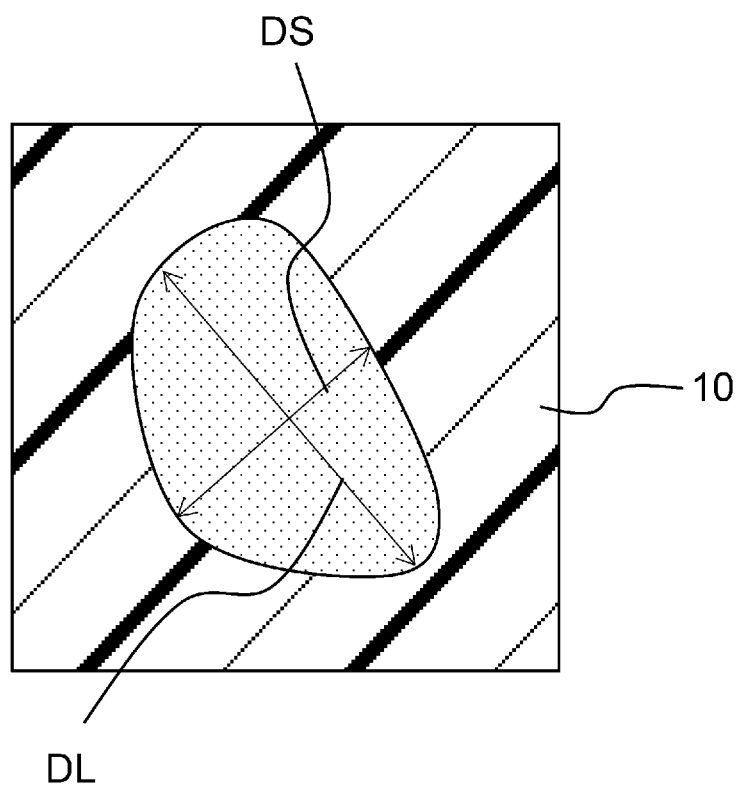
Figure 4:
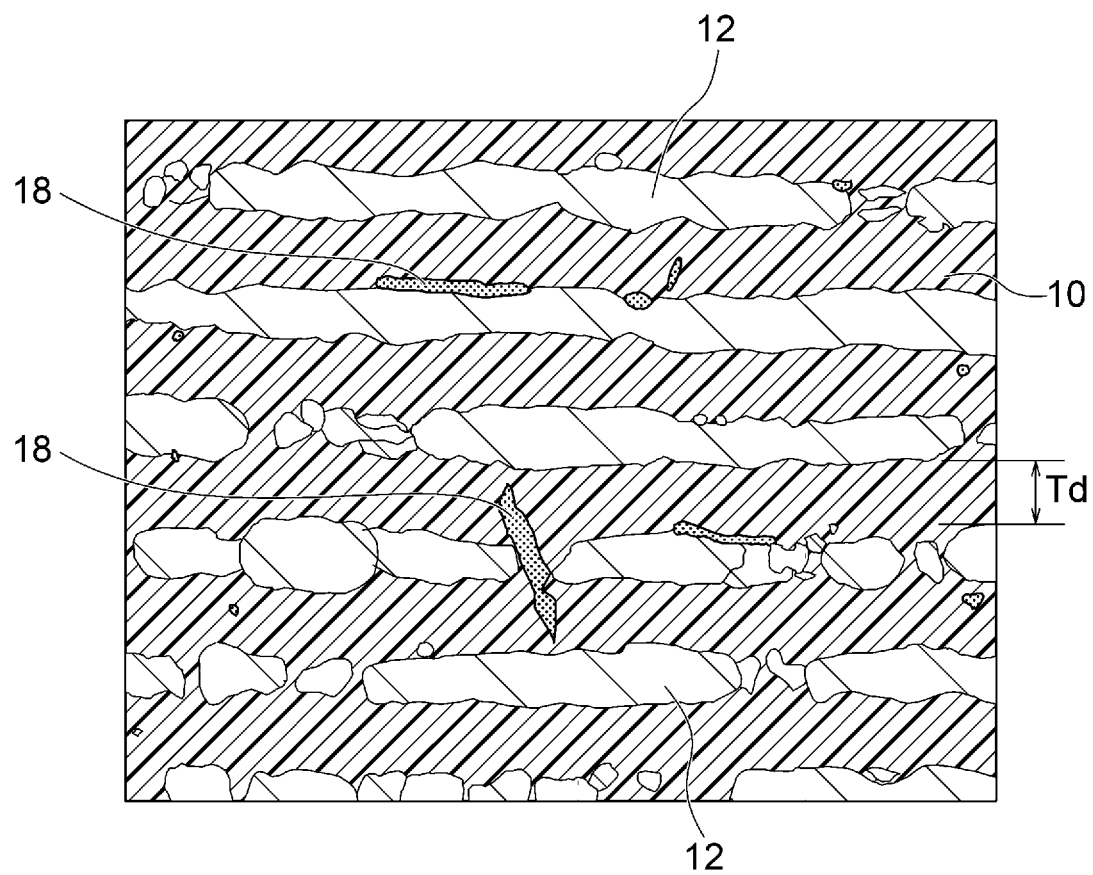
Figure 5:
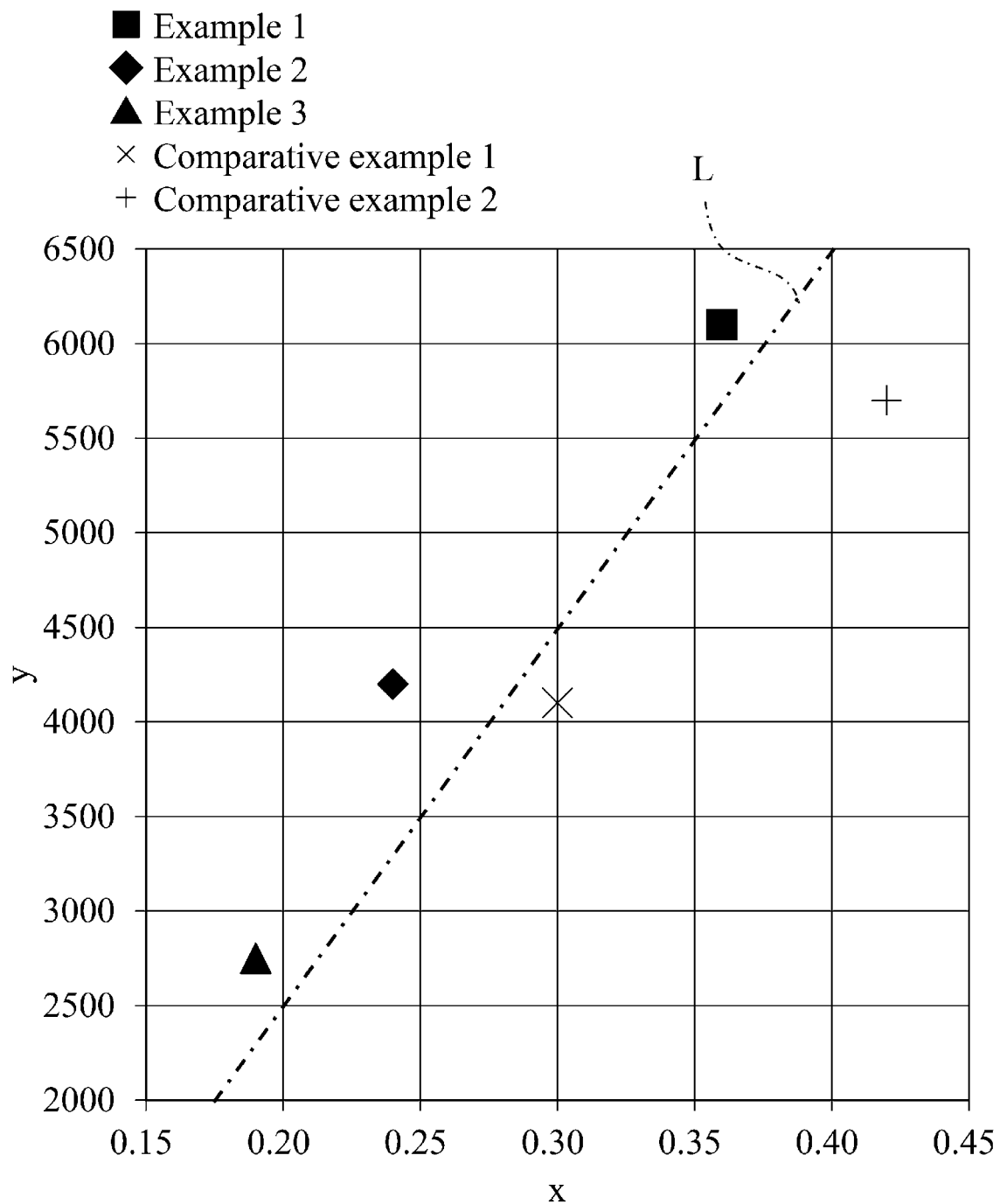

FIG. 1 is a cross-sectional view of a multilayer ceramic capacitor according to an embodiment of the present invention;

FIG. 2 is an enlarged view of part II in FIG. 1;
FIG. 3 is an enlarged view of part III in FIG. 2;
FIG. 4 is an enlarged cross-sectional view of a capacitance region of a multilayer ceramic capacitor in the related art; and
FIG. 5 is a graph in which an x-axis represents a grain size [μm] of dielectric grains and a y-axis represents a specific dielectric constant.

DETAILED DESCRIPTION

As one embodiment of the ceramic electronic device according to the present invention, an overall structure of a multilayer ceramic capacitor will be described. FIG. 1 shows a cross-sectional view of a typical multilayer ceramic capacitor 2.

The multilayer ceramic capacitor 2 includes inner dielectric layers 10 (dielectric ceramic composition) and internal electrode layers 12 substantially parallel to a plane including an X-axis and a Y-axis, and includes an element body 4 in which inner dielectric layers 10 and internal electrode layers 12 are alternately stacked along a Z-axis direction.

Here, "substantially parallel" means that most portions are parallel, but some non-parallel portions may exist, and means that the inner dielectric layers 10 and the internal electrode layers 12 may be slightly uneven or slanted.

In the present embodiment, the X, Y and Z axes are perpendicular to each other. In the present embodiment, an "inner side" means a side close to a center of the multilayer ceramic capacitor 2, and an "outer side" means a side away from the center of the multilayer ceramic capacitor 2.

In the present embodiment, one of the alternately stacked internal electrode layers 12 is electrically connected to an inner side of an external electrode 6A formed on an outer side of an end portion of the element body 4 in one side of an X-axis direction. The other of the alternately stacked internal electrode layers 12 is electrically connected to an inner side of an external electrode 6B formed on an outer side of end portion of the element body 4 in the other side the X-axis direction.

As shown in FIG. 1, the multilayer ceramic capacitor 2 according to the present embodiment includes the element body 4 and the external electrodes 6A, 6B.

In the element body 4, a portion where the inner dielectric layers 10 and the internal electrode layers 12 are alternately stacked is an interior region 13. Portions formed on both end surfaces of the element body 4 in a stacking direction Z (Z-axis) are exterior regions 11. The exterior region 11 is formed by stacking a plurality of outer dielectric layers thicker than the inner dielectric layers 10 constituting the interior region 13. Note that in the following description, the inner dielectric layer 10 and the outer dielectric layer may be collectively referred to as a "dielectric layer".

One of the alternately stacked internal electrode layers 12 includes a lead-out region internal electrode layer 125A that is electrically connected to the inner side of the external electrode 6A formed on an outer side of a first end portion of the element body 4 in the X-axis direction. The other of the alternately stacked internal electrode layers 12 includes a lead-out region internal electrode layer 125B that is electrically connected to the inner side of the external electrode 6B formed on an outer side of a second end portion of the element body 4 in the X-axis direction.

The internal electrode layer 12 is formed with a capacitance region internal electrode layer 124 on inner sides of the lead-out region internal electrode layers 125A, 125B.

The interior region 13 includes a capacitance region 14 and lead-out regions 15A, 15B. The capacitance region 14 is a region where the capacitance region internal electrode layers 124 of the internal electrode layers 12 are stacked while sandwiching the inner dielectric layers 10 along the stacking direction.

The lead-out region 15A is a region where the lead-out region internal electrode layers 125A of the internal electrode layers 12 that are connected to the external electrode 6A are stacked while sandwiching the inner dielectric layers 10 along the stacking direction.

The lead-out region 15B is a region where the lead-out region internal electrode layers 125B of the internal electrode layers 12 that are connected to the external electrode 6B are stacked while sandwiching the inner dielectric layers 10 along the stacking direction.

The capacitance region 14 and the lead-out regions 15A, 15B can be expressed as follows. That is, the capacitance region 14 is a region in which the capacitance region internal electrode layers 124 conducting with the external electrode 6A and the capacitance region internal electrode layers 124 conducting with the external electrode 6B are alternately stacked while sandwiching the inner dielectric layers 10. The lead-out region 15A is a region in which the lead-out region internal electrode layers 12A connected to the external electrode 6A and the inner dielectric layers 10 are alternately stacked. The lead-out region 15B is a region in which the lead-out region internal electrode layers 12B connected to the external electrode 6B and the inner dielectric layers 10 are alternately stacked.

The capacitance region 14 is a region that contributes to capacitance. On the other hand, the lead-out regions 15A, 15B are regions that do not contribute to capacitance.

In the present embodiment, a shape and dimensions of the element body 4 are not particularly limited. The shape may be an elliptical columnar shape, a cylindrical columnar shape, or a prismatic shape. A length L0 of the element body 4 in the X-axis direction may be, for example, 0.6 mm to 5.7 mm. A length W0 of the element body 4 in a Y-axis direction may be, for example, 0.3 mm to 5.0 mm. A length T0 of the element body 4 in the Z-axis direction may be, for example, 0.3 mm to 2.0 mm.

A thickness of the inner dielectric layer 10 is not particularly limited. For example, a thickness Td of the inner dielectric layer 10 sandwiched between the internal electrode layers 12 is preferably 30 µm or less, more preferably 15 µm or less, and still more preferably 10 µm or less. Since the multilayer ceramic capacitor 2 according to the present embodiment can be made thin, the thickness of the inner dielectric layer 10 can be made as thin as approximately 0.5 µm.

The number of layers of the inner dielectric layers 10 is not particularly limited, but is preferably 20 or more, more preferably 50 or more, and still more preferably 100 or more.

Material of the dielectric layer is not particularly limited, but in the present embodiment, the dielectric layer contains a perovskite-type structure represented by $ABO_3$ as a main component.

The "dielectric layer contains a perovskite-type structure represented by $ABO_3$ as a main component" means that in the dielectric layer, a content of the perovskite-type structure represented by $ABO_3$ is 90 mass % or more.

The perovskite-type structure represented by $ABO_3$ according to the present embodiment contains at least one selected from the group consisting of Ba, Ca, and Sr at A site and at least one selected from the group consisting of Ti and Zr at B site. That is, for example, the perovskite-type structure represented by $ABO_3$ is a perovskite-type structure represented by $(Ba_{1-a-b}Sr_aCa_b)_m(Ti_{1-c-d}Zr_cHf_d)O_3$.

The m indicates an element ratio of the A site and the B site, and, for example, $0.94 < m < 1.1$.

The a indicates an element ratio of Sr, and, for example, $0 \leq a \leq 1$, preferably $0 \leq a < 1$, and more preferably $0 \leq a \leq 0.5$.

The b indicates an element ratio of Ca, and $0 \leq b \leq 1$, preferably $0 \leq b < 1$, and more preferably $0 \leq b \leq 0.5$.

The c indicates an element ratio of Zr, and $0 \leq c \leq 1$, preferably $0 \leq c < 1$, and more preferably $0 \leq c \leq 0.15$.

The d indicates an element ratio of Hf, and $0 \leq d \leq 1$, preferably $0 \leq d < 1$, and more preferably $0 \leq d \leq 0.05$.

Note that an element ratio of oxygen (O) in the above composition formula may deviate in some extent from the stoichiometric composition.

The dielectric layer according to the present embodiment contains sub-components in addition to these main components. The sub-components according to the present embodiment include MgO, $SiO_2$, and MnO. The sub-components according to the present embodiment may also include $R_2O_3$, NiO, and $Cr_2O_3$. The R is a rare earth element, and although R is not particularly limited, it is at least one selected from the group of consisting Y, Dy, Ho, and Yb, and more preferably Y or Dy. The rare earth element may be used alone or in combination of two or more. Furthermore, the sub-components according to the present embodiment may contain at least one element selected from the group of consisting V, Ta, Nb, Mo, and W.

In the present embodiment, a molar ratio ($MgO/SiO_2$) in the dielectric layer is 1 to 5.

When $MgO/SiO_2$ is within the above range, as compared with a case where $MgO/SiO_2$ is below the above range, formation of Mg—Si—O segregation phase can be reduced. As a result, a predetermined Mg—Mn—O-based segregation phase 18 is easily obtained.

When $MgO/SiO_2$ is within the above range, as compared with a case where $MgO/SiO_2$ is above the above range, $SiO_2$ easily functions as a sintering aid. As a result, strength of the multilayer ceramic capacitor 2 can be improved.

In the present embodiment, a molar ratio (MgO/MnO) in the dielectric layer is 5 to 13.

When MgO/MnO is within the above range, as compared with a case where MgO/MnO is below the above range, reaction between Mn and Ni, which constitutes the internal electrode layer 12, is less likely to occur, and discontinuous portions 121 are less likely to be generated, so that electrode disconnection is easily prevented.

When MgO/MnO is within the above range, as compared with a case where MgO/MnO is above the above range, resistance to reduction of MnO functions easily. As a result, a highly accelerated life time can be improved.

In the present embodiment, when an amount of the main component in the dielectric layer is 100 molar parts, an amount of $R_2O_3$ in the dielectric layer is 0.4 to 2.0 molar parts.

In the present embodiment, when the amount of the main component in the dielectric layer is 100 molar parts, an amount of MgO in the dielectric layer is 0.5 to 2.0 molar parts.

In the present embodiment, when the amount of the main component in the dielectric layer is 100 molar parts, an amount of MnO in the dielectric layer is 0.01 to 0.20 molar parts.

In the present embodiment, when the amount of the main component in the dielectric layer is 100 molar parts, an amount of $SiO_2$ in the dielectric layer is 0.18 to 2.95 molar parts.

The dielectric layer includes dielectric grains, grain boundaries (not shown) formed between a plurality of adjacent dielectric grains, and a segregation phase, which will be described later. In the present embodiment, the dielectric grains may be crystal grains of the main component ($ABO_3$) alone, or may be grains in which sub-component elements are dissolved (solid-solution) in the main component.

Although a grain size of the dielectric grains is not particularly limited, it is preferably 0.1 µm to 0.5 µm.

Although a conductive material contained in the internal electrode layer 12 is not particularly limited, preferred examples thereof include Ni, Ni-based alloys, Cu, and Cu-based alloys. Note that Ni, Ni-based alloys, Cu, or Cu-based alloys may contain various minor components such as P in an amount of approximately 0.1 mass % or less. When the internal electrode layer 12 contains Ni or a Ni-based alloy as the main component, it may contain one or more sub-components selected from the group of consisting Mn, Cu, Cr, Fe, and the like. The Ni-based alloy is preferably an alloy of one or more elements selected from the group of consisting Mn, Cr, Co, and Al and Ni, and an amount of Ni in the alloy is preferably 95 mass % or more.

A thickness of the internal electrode layer 12 may be appropriately determined depending on application and the like, and is usually preferable to be approximately 0.1 µm to 3 µm, and is particularly preferable to be approximately 0.2 µm to 2.0 µm.

The external electrodes 6A, 6B of the present embodiment are formed on the element body 4 in a manner of being electrically connected to at least a part of the internal electrode layer 12.

A conductive material contained in the external electrodes 6A, 6B is not particularly limited. For example, known conductive materials such as Ni, Cu, Sn, Ag, Pd, Pt, Au, alloys thereof, and conductive resins may be used. A thickness of the external electrodes 6A, 6B may be appropriately determined according to application and the like, and is usually preferable to be approximately 10 μm to 50 μm.

FIG. 2 is an enlarged view of part II in FIG. 1. As shown in FIG. 2, the element body 4 according to the present embodiment includes the segregation phase 18. A position of the segregation phase 18 is not particularly limited, and for example, the segregation phase 18 is included in a layer in which the inner dielectric layer 10 is formed. The segregation phase 18 may be in contact with the internal electrode layer 12 or may be in contact with the internal electrode layer 12 by being embedded therein. Furthermore, the segregation phase 18 may exist in the discontinuous portion 121 of the internal electrode layer 12. That is, the discontinuous portion 121 of the internal electrode layer 12 is constituted by the components of the inner dielectric layer 10, and the segregation phase 18 may exist therein. Furthermore, the segregation phase 18 may be included in the exterior region 11.

Note that in the cross section shown in FIG. 2, the internal electrode layer 12 appears to be discontinuous due to the discontinuous portion 121, but the discontinuous portions 121 are scattered on principal plane of the internal electrode layer 12. Therefore, even if the internal electrode layer 12 is discontinuous in the cross section shown in FIG. 2, the internal electrode layer 12 is continuous in other cross sections, and conduction of the internal electrode layer 12 is ensured. Each internal electrode layer 12 exists not only along the X-axis direction but also along the Y-axis direction.

FIG. 3 is an enlarged view of part III in FIG. 2. As shown in FIG. 3, in the present embodiment, assuming that a long grain size of the segregation phase 18 is DL and a short grain size of the segregation phase 18 is DS, DL and DS preferably satisfy 1<DL/DS<2, and more preferably satisfy 1≤DL/DS≤1.5.

In the present embodiment, assuming that the thickness of the inner dielectric layer 10 is Td and the long grain size of the segregation phase 18 is DL, Td/DL is preferably greater than 1.4, and more preferably satisfy 1.4≤Td/DL≤4.7.

In the present embodiment, a circle equivalent diameter (Da) of the segregation phase 18 is preferably 0.12 μm to 1.0 μm. Note that the circle equivalent diameter (Da) indicates a diameter of a circle having the same area as that of the shape. When Da is within the above range, as compared with a case where Da is above the above range, the highly accelerated life time can be increased and the strength of the multilayer ceramic capacitor 2 can be improved.

The segregation phase 18 positioned in the capacitance region 14 is referred to as a capacitance region segregation phase 184. An area ratio of the capacitance region segregation phase 184 in a predetermined range of the capacitance region 14 is assumed as S1. Furthermore, the segregation phase 18 positioned in the lead-out region 15 is referred to as a lead-out region segregation phase 185. An area ratio of the lead-out region segregation phase 185 in a predetermined range of the lead-out region 15 is assumed as S2. In the present embodiment, S1/S2 is preferably smaller than 1, and more preferably satisfies 0.2≤S1/S2≤1.0. That is, in the present embodiment, the segregation phase 18 exists more in the lead-out region 15 than in the capacitance region 14.

Note that the predetermined range is not particularly limited, and may be, for example, a rectangular range having a side of 20 μm to 100 μm.

The long grain size (DL) and short grain size (DS) of the segregation phase 18, the circle equivalent diameter (Da) of the lead-out region segregation phase 185, the area ratio (S1) of the capacitance region segregation phase 184, and the area ratio (S2) of the lead-out region segregation phase 185 can be analyzed by cross-sectional observation with an electron probe microanalyzer (EPMA).

First, a backscattered electron image and an elemental image map are collected simultaneously by EPMA. Next, drawing software and a pen tablet are used to trace a scale bar and a contour of the segregation phase 18 in the backscattered electron image.

Based on a relation between a length of the scale bar obtained by tracing and the number of pixels, a length per pixel is used as a calibration value.

Next, the number of pixels corresponding to the long grain size (DL) and the number of pixels corresponding to the short grain size (DS) of the segregation phase 18 obtained by tracing are collected using analysis software. The calibration value is used to convert the number of pixels corresponding to the long grain size (DL) to a length. The calibration value is also used to convert the number of pixels corresponding to the short grain size (DS) to a length. In this way, the length of the long grain size (DL) and the length of the short grain size (DS) are obtained.

The number of pixels inside the contour of the segregation phase 18 obtained by tracing is collected using analysis software. The calibration value is used to convert the number of pixels inside the contour to an area. In this way, the area of the segregation phase 18 is obtained. The circle equivalent diameter (Da) can be obtained from the obtained area of the segregation phase 18.

Furthermore, the area ratio (S1) of the capacitance region segregation phase 184 or the area ratio (S2) of the lead-out region segregation phase 185 can be obtained from the sum of an area of an observation field and an area of the segregation phase 18 within the observation field.

The composition of the segregation phase 18 can be measured by composition analysis using EPMA or the like during cross section observation. It is preferable to perform the composition analysis on at least three locations and calculate the composition of the segregation phase 18 from an average value of measurement results. In the present embodiment, an energy dispersive spectroscope (EDS) or a wavelength dispersive spectroscope (WDS) can be used as an X-ray spectroscope for the composition analysis by EPMA.

In the present embodiment, when a total amount of MgO, NiO, MnO, $Cr_2O_3$, and $SiO_2$ in the segregation phase 18 is 100 molar parts, the amount of MgO in the segregation phase 18 is preferably 63.0 molar parts to 99.5 molar parts.

In the present embodiment, when the total amount of MgO, NiO, MnO, $Cr_2O_3$, and $SiO_2$ in the segregation phase 18 is 100 molar parts, the amount of MnO in the segregation phase 18 is preferably 0.5 molar parts to 12.6 molar parts.

In the present embodiment, when the total amount of MgO, NiO, MnO, $Cr_2O_3$, and $SiO_2$ in the segregation phase 18 is 100 molar parts, the amount of NiO in the segregation phase 18 is preferably 0 molar part to 36 molar parts. The segregation phase 18 may be a solid solution of Ni which constitutes the internal electrode layer 12, Mg, and, Mn.

In the present embodiment, when the total amount of MgO, NiO, MnO, $Cr_2O_3$, and $SiO_2$ in the segregation phase 18 is 100 molar parts, the amount of $Cr_2O_3$ in the segregation phase 18 is preferably 0 molar part to 0.1 molar part.

When the total amount of MgO, NiO, MnO, $Cr_2O_3$, and $SiO_2$ in the segregation phase 18 is 100 molar parts, the amount of $SiO_2$ in the segregation phase 18 is preferably 0 molar part to 0.01 molar part.

Next, an example of a method for manufacturing the multilayer ceramic capacitor 2 shown in FIG. 1 will be described.

First, raw material powder of the main component ($ABO_3$) constituting the dielectric ceramic composition and gel-like compound slurry of the elements contained in the sub-components or solution of the elements are prepared. The gel-like compound is not particularly limited, and is preferably gel-like hydroxide, gel-like carbide, gel-like oxide and the like, but gel-like hydroxide is prepared in the present embodiment.

Moreover, the solution of the elements contained in the sub-components is not particularly limited, and is preferably a water solution of the elements contained in the sub-components. In the present embodiment, a water solution of the elements is prepared. It is preferable to use the form of acetate, citrate, succinate, or the like as a metal salt to be used in the water solution. Acetate is used in the present embodiment.

However, as for Si, gel slurry using ethanol as a solvent is prepared, or Si fine grain water dispersion (aqueous dispersion) is prepared. As the Si fine grain water dispersion, a dispersion in which silica colloid is dispersed in water is prepared.

The raw material powder of the main component is not particularly limited, and oxides of the above components, mixtures thereof, and composite oxides thereof can be used. Various compounds that become the above-described oxides and composite oxides by firing, such as carbonates, oxalates, nitrates, hydroxides, and organometallic compounds, may be appropriately selected and mixed for use.

The raw material of the main component can be produced by various methods such as various liquid phase methods (for example, an oxalate method, a hydrothermal synthesis method, an alkoxide method, and a sol gel method) in addition to the so-called solid phase method.

Not all amount of the metal elements contained in the sub-components needs to be added in the form of gel-like hydroxide slurry or water solution. For example, Mg gel-like hydroxide slurry and Mg oxide powder may be used to produce the dielectric ceramic composition according to the present embodiment.

Hydroxide grains in the gel-like hydroxide slurry are extremely fine. For example, a grain diameter thereof is approximately 5 nm to 10 nm. The hydroxide grains in the gel-like hydroxide slurry are uniformly dispersed together with the raw material powder of the main component in a mixture step described later, and coat surfaces of main component grains ($ABO_3$ grains) after drying. The elements dissolved in the water solution also coat the surfaces of the main component grains after drying.

Next, in the present embodiment, the raw material powder of the main component and the gel-like hydroxide slurry or water solution of the sub-component elements obtained above are pre-dispersed together with water. This pre-dispersion is performed to lightly disperse the raw material powder of the main component and the gel-like hydroxide slurry, and is not intended for grinding the raw material powder of the main component. For example, the pre-dispersion is performed using a ball mill for approximately 1 to 2 hours. In this case, a stirrer such as a disperser other than a ball mill may be used.

Next, a mixture after the pre-dispersion is dispersed using a medium stirring disperser to obtain a raw material mixture. In the present embodiment, a bead mill is used as the medium stirring disperser. Conditions for the dispersing and mixing are not particularly limited, but it is preferable to use a medium with a diameter of 0.1 mm or less, for example.

In the dispersion, the raw material powder of the main component is grinded, and the raw material powder of the main component and the elements constituting the sub-components (gel-like hydroxides or additional metal elements in the water solution) are uniformly dispersed. As a result, after drying, the surface of the main component grains can be coated with the gel-like hydroxide and the like. In the dispersion, it is preferable to add a hydrophilic dispersant to further enhance dispersibility of the raw material mixture. Examples of the hydrophilic dispersant include polycarboxylic acid-based dispersants.

The raw material mixture obtained is dried. In the raw material mixture after drying, the surfaces of the main component grains are coated with the additive metal elements in the gel-like hydroxide slurry or in the water solution. That is, the elements added as the gel-like hydroxide slurry or water solution physically adsorb to and coat the main component grains.

Note that a drying method is not particularly limited, and may be appropriately selected from static drying, spray drying, freeze drying, and the like. A drying temperature is not particularly limited as long as it is a temperature that can remove the solvent of the raw material mixture.

By producing the raw material mixture through such steps, damage given to the main component grains is minimized, crystallinity of the main component grains is maintained, and the main component grains can be uniformly coated with the elements constituting the sub-components.

Therefore, in order to maintain the crystallinity of the main component grains, a specific surface area of the raw material powder of the coated main component contained in the raw material mixture after drying is measured by a BET method, and is preferably 1.4 times or less of a specific surface area of the raw material powder of the main component before the pre-dispersion.

Subsequently, the raw material mixture after drying is heat-treated. By performing the heat treatment, the additive component elements coated on the surfaces of the main component grains are more strongly adhered to the grains. For the heat treatment, for example, a rotary kiln, a tunnel furnace, or a batch furnace can be used. A retention temperature in the heat treatment is preferably in a range of 400° C. to 900° C. A retention time is preferably 0.2 to 3.0 hours. Note that the drying and the heat treatment of the raw material mixture may be performed simultaneously. Examples of a method for simultaneously performing the drying and the heat treatment include a spray pyrolysis method.

Since the raw material mixture is aggregated after the heat treatment, the raw material mixture may be grinded to an extent that the aggregation is loosened. Note that this grinding may be performed when preparing a dielectric layer paste, which will be described later.

A grain size of the raw material mixture (ceramic raw material powder) after the heat treatment is usually approximately 0.1 μm to 1 μm in average grain size. Next, the ceramic raw material powder is made into a paint to prepare the dielectric layer paste. The dielectric layer paste may be an organic paint obtained by kneading a dielectric raw material (ceramic raw material powder) and an organic vehicle, or may be an aqueous paint.

The organic vehicle is obtained by dissolving a binder in an organic solvent. The binder used for the organic vehicle is not particularly limited, and may be appropriately selected from various ordinary binders such as ethyl cellulose and polyvinyl butyral. The organic solvent to be used is also not particularly limited, and may be appropriately selected from various organic solvents such as terpineol, butyl carbitol, acetone, and toluene, depending on a method of use such as a printing method and a sheet method.

When the dielectric layer paste is an aqueous paint, the aqueous paint may be obtained by kneading an aqueous vehicle in which a water-soluble binder or dispersant is dissolved in water, with the dielectric raw material. The water-soluble binder used in the aqueous vehicle is not particularly limited, and polyvinyl alcohol, cellulose, water-soluble acrylic resin, and the like may be used.

An internal electrode layer paste is prepared by kneading a conductive material made of the various conductive metals and alloys described above, or various oxides, organometallic compounds, and the like that become the conductive material after firing, with the organic vehicle described above. The internal electrode layer paste may contain an inhibitor. Although the inhibitor is not particularly limited, it preferably has the same composition as the main component.

An external electrode paste may be prepared in the same manner as the internal electrode layer paste described above.

There is no particular limitation on an amount of the organic vehicle in each of the pastes described above, and a usual amount thereof may be, for example, approximately 1 mass % to 5 mass % for the binder and approximately 10 mass % to 50 mass % for the solvent. Each paste may contain additives selected from various dispersants, plasticizers, dielectrics, insulators, and the like, if necessary. A total amount of these additives is preferably 10 mass % or less.

When the printing method is used, the dielectric layer paste and the internal electrode layer paste are printed and laminated on a substrate such as PET, cut into a predetermined shape, and peeled from the substrate to obtain a green chip.

When the sheet method is used, the dielectric layer paste is used to form a green sheet, the internal electrode layer paste is printed thereon to form an internal electrode pattern, and the green sheet and the internal electrode pattern are laminated to obtain a green chip.

Before firing, the green chip is subjected to a binder removal treatment. As binder removal conditions, a temperature increase rate is preferably 5° C./hour to 300° C./hour, a retention temperature is preferably 180° C. to 400° C., and a temperature retention time is preferably 0.5 hours to 24 hours. A binder removal atmosphere is air or a reducing atmosphere.

In firing the green chip, a temperature increase rate is preferably 500° C./hour to 2000° C./hour. In the present embodiment, by making the temperature increase rate relatively fast, reaction between Mg and Si can be prevented, and the segregation phase 18 containing predetermined amounts of Mg and Mn can be easily formed.

A retention temperature during firing is preferably 1300° C. or less, more preferably 1100° C. to 1250° C., and a retention time is preferably 0.5 hours to 8 hours, and more preferably 1 hours to 3 hours.

A firing atmosphere is preferably a reducing atmosphere, and as atmosphere gas, for example, a mixed gas of $N_2$ and $H_2$ can be humidified and used.

An oxygen partial pressure during firing may be appropriately determined according to a type of the conductive material in the internal electrode layer paste, and when a base metal such as Ni or a Ni-based alloy is used as the conductive material, the oxygen partial pressure in the firing atmosphere is preferably $10^{-14}$ MPa to $10^{-10}$ MPa. A temperature decrease rate is preferably 50° C./hour to 2000° C./hour.

After firing in the reducing atmosphere, the element body 4 is preferably annealed. The annealing is a treatment for re-oxidizing the dielectric layer, which can significantly lengthen an insulation resistance life time (IR life time), thereby improving reliability.

An oxygen partial pressure in an annealing atmosphere is preferably $10^{-9}$ MPa to $10^{-5}$ MPa.

A retention temperature during annealing is preferably 1100° C. or less, and is particularly preferably 900° C. to 1100° C. A temperature retention time is preferably 0 hour to 20 hours, and more preferably 2 hours to 4 hours, and a temperature decrease rate is preferably 50° C./hour to 500° C./hour, and more preferably 100° C./hour to 300° C./hour. As atmosphere gas for annealing, it is preferable to use, for example, humidified $N_2$ gas.

In the present embodiment, by performing the annealing in two stages, it is easy to form the segregation phase 18 containing a predetermined amount of Mg and Mn. Note that the two-stage annealing is annealing in which a temperature is retained at a temperature T° C. lower than that of a first-stage annealing after a heating up step of the first-stage annealing, and T is preferably more than 0 and 200 or less.

In the binder removal treatment, firing, and annealing described above, a wetter or the like may be used to humidify the $N_2$ gas or the mixed gas. In this case, a water temperature is preferably approximately 5° C. to 75° C.

The binder removal treatment, firing, and annealing may be performed continuously or independently.

The element body 4 obtained as described above is subjected to end surface polishing by, for example, barrel polishing or sandblasting, applied with the external electrode paste and then fired to form the external electrodes 6A, 6B. Then, if necessary, coating layers are formed on surfaces of the external electrodes 6A, 6B by plating or the like.

The multilayer ceramic capacitor 2 of the present embodiment manufactured in this manner is mounted on a printed circuit board or the like by soldering or the like, and used in various electronic devices and the like.

According to the multilayer ceramic capacitor 2 according to the present embodiment, the reliability can be improved and a high specific dielectric constant can be maintained even when a thickness thereof is reduced. It is believed that this is because that the multilayer ceramic capacitor 2 according to the present embodiment contains the segregation phase 18 having a predetermined Mg—Mn—O-based composition.

In a multilayer ceramic capacitor in the related art, a needle-like segregation phase 18 shown in FIG. 4 tends to be formed. The needle-like segregation phase 18 is an Mg—Si—O-based segregation phase or an Mg—Cr—O-based segregation phase. The needle-like segregation phase 18 tends to grow large and has a large long grain size. Therefore, the needle-like segregation phase 18 may be formed bridging one internal electrode layer 12 and the other internal electrode layer 12 adjacent to the inner dielectric layer 10. This is considered to be one of factors that reduce the reliability and increase an initial defect rate.

Since the needle-like segregation phase 18 tends to grow large, when a thickness of the inner dielectric layer 10 is reduced, there may be a portion where there is a single grain in the laminating direction of the inner dielectric layers 10, which is not suitable for thinning the multilayer ceramic capacitor 2.

In contrast, in the present embodiment, as shown in FIGS. 2 and 3, the Mg—Mn—O-based segregation phase 18 is formed. The Mg—Mn—O-based segregation phase 18 is difficult to grow largely. Therefore, a ratio of the long grain size to the short grain size of the Mg—Mn—O-based segregation phase 18 is kept within a predetermined range, the Mg—Mn—O-based segregation phase 18 has a nearly spherical shape, and the long grain size (DL) is sufficiently shorter than the thickness (Td) of the inner dielectric layer 10. That is, the Mg—Mn—O-based segregation phase 18 is dispersed in the inner dielectric layer 10 in a small size. Therefore, bridging between one internal electrode layer 12 and the other internal electrode layer 12 adjacent to the inner dielectric layer 10 can be prevented. A large number of grains can be ensured in the laminating direction of the inner dielectric layers 10. As a result, according to the present embodiment, it is considered that the reliability of the multilayer ceramic capacitor 2 can be improved.

Furthermore, according to the multilayer ceramic capacitor 2 according to the present embodiment, it is possible to improve the specific dielectric constant of the dielectric grains while reducing the grain size thereof, so that the present invention can be suitably used for the thin multilayer ceramic capacitor 2. It is considered that Mg contained as an element constituting the sub-component of the inner dielectric layer 10 contributes to the above effects. By containing Mg as an element constituting the sub-component of the inner dielectric layer 10, grain growth of the dielectric grains containing the main component can be prevented. It is considered that in this way, the grain size of the dielectric grains can be reduced. Furthermore, since formation of a segregation phase that is paraelectric is prevented, and a proportion of ferroelectrics (dielectric grains containing a main component represented by $ABO_3$) in the dielectric layer is increased, it is considered that the specific dielectric constant of the entire dielectric layer can be increased.

Note that the present invention is not limited to the above embodiment, and various modifications can be made within the scope of the present invention.

For example, the multilayer electronic device of the present invention can be applied not only to a multilayer ceramic capacitor but also to other multilayer electronic devices. Other multilayer electronic devices include all electronic devices including a dielectric layer, such as band-pass filters, multilayer three-terminal filters, piezoelectric elements, PTC thermistors, NTC thermistors, and varistors.

In the present embodiment, the inner dielectric layers 10 and the internal electrode layers 12 are stacked in the Z-axis direction, but the laminating direction may be the X-axis direction or the Y-axis direction. In that case, the external electrodes 6A, 6B may be formed matching exposed surfaces of the internal electrode layers 12. Furthermore, the element body 4 may not be a stacked body, and may be a single layer. Furthermore, the internal electrode layer 12 may be led out to an outer surface of the element body 4 via through-hole electrodes, in which case the through-hole electrodes and the external electrodes 6A, 6B are electrically connected to each other.

In the above embodiment, the dielectric layer paste is obtained by using the raw material mixture in which the elements contained in the sub-components are adhered to the raw material powder of the main component by a coating method, but instead of the above raw material mixture, a calcined powder of the main component and a calcined powder containing the elements constituting the segregation phase 18 may be prepared.

However, from the viewpoint of improving the reliability and the specific dielectric constant, it is preferable to obtain the dielectric layer paste using the raw material mixture adhered by the coating method in the above embodiment.

One of the purposes of adding Mg, which is a sub-component, is to prevent the grain growth of the dielectric grains containing the main component. In the coating method of the above embodiment, the elements constituting the sub-components such as Mg are coated in advance around the main component grains. Due to this coating, the sub-components physically inhibit the grain growth by the main component grains directly adhering to each other.

In contrast, if the sub-components are calcined and then added, a dispersion state of the sub-components is inferior to that in the coating method, so that the grain growth of the dielectric grains containing the main component is likely to proceed. For this reason, compared with the case of calcining the sub-components, in the coating method, it is difficult for the grain growth of the dielectric grains containing the main component to proceed, and deviation in the grain size of crystals is reduced, and as a result, it is considered that deviation in electrical properties such as the specific dielectric constant can be reduced, and the reliability and the specific dielectric constant are improved.

As described above, according to the coating method, it is easy to prevent the grain growth of the dielectric grains containing the main component, and as a result, it is easy to reduce the grain size of the dielectric grains, so that the present invention can be suitably used for thin multilayer ceramic capacitors.

EXAMPLES

The present invention will be described in more detail below with reference to Examples of the present invention, but the present invention is not limited to these Examples.

Examples 1 to 3, Comparative Examples 1 and 2

Elements constituting the main component and elements constituting the sub-components were prepared so as to have a composition shown in Table 1, and a dielectric layer paste was obtained using a raw material mixture which was adhered by a coating method.

Then, the dielectric layer paste prepared above was used to form a green sheet on a PET film. An internal electrode layer paste was screen-printed to form the green sheet.

A plurality of green sheets were stacked and adhered by pressure to form a green stacked body, and the green stacked body was cut into a predetermined size to obtain a green chip.

Next, the obtained green chip was subjected to a binder removal treatment, firing, and annealing under the following conditions to obtain a sintered body (element body 4).

The binder removal treatment conditions were as follows. Note that atmosphere in only Example 3 was air.

Retention temperature: 200° C. to 900° C.
Atmosphere gas: humidified $N_2+H_2$ mixed gas
Oxygen partial pressure: $10^{-12}$ MPa
The firing conditions were as follows.

Temperature increase rate: described in Table 2
Atmosphere gas: humidified $N_2+H_2$ mixed gas
Oxygen partial pressure: $10^{-12}$ MPa
The annealing conditions were as follows.
Retention temperature: 850° C. to 1081° C.
Atmosphere gas: humidified $N_2$ gas
Oxygen partial pressure: $10^{-12}$ MPa Note that a wetter was used to humidify the atmosphere gas during firing and annealing.

Next, end face surfaces of the obtained element body 4 were barrel-polished by sandblasting. Then, after coating Cu as the external electrodes 6A, 6B, baking was performed in nitrogen gas to obtain a capacitor sample of the multilayer ceramic capacitor 2 shown in FIG. 1.

A size of the element body 4 of the obtained capacitor sample 2 was L0×W0×T0=2.0 mm×1.25 mm×1.25 mm. The number of the inner dielectric layers 10 sandwiched between the internal electrode layers 12 was 360.

<Observation of Capacitance Region>

In a cross section of the obtained capacitor sample, the capacitance region 14 was observed in a 6 μm×6 μm field of view. The longest grain size of the capacitance region segregation phase 184 is defined as the long grain size (DL), and the shortest grain size of the capacitance region segregation phase 184 is defined as the short grain size (DS). DL/DS was calculated for each field of view, and Table 2 shows the maximum DL/DS and the minimum DL/DS.

DL/Td was calculated from the longest long grain size (DL) among all capacitance region segregation phase 184 observed in each field of view and an average thickness (Td) of the inner dielectric layers 10 in each field of view. Results are shown in Table 2.

An average circle equivalent diameter (Da) of the capacitance region segregation phase 184 observed in each field of view was obtained. Results are shown in Table 2. Note that shaded sections indicate unmeasured.

Area ratios (S1) of the capacitance region segregation phase 184 with respect to an area of each field of view described above were obtained, and an average value thereof was calculated.

<Observation of Lead-Out Region>

In a cross section of the obtained capacitor sample, the lead-out region 15 was observed in a 6 μm×6 μm field of view. The longest grain size of the lead-out region segregation phase 185 confirmed within one field of view is defined as the long grain size (DL), and the shortest grain size of the lead-out region segregation phase 185 is defined as the short grain size (DS). DL/DS was calculated for each field of view, and Table 2 shows the maximum DL/DS and the minimum DL/DS.

DL/Td was calculated from the longest long grain size (DL) among all lead-out region segregation phase 185 observed in each field of view and an average thickness (Td) of the inner dielectric layers 10 in each field of view. Results are shown in Table 2.

An average circle equivalent diameter (Da) of the lead-out region segregation phase 185 observed in each field of view was obtained. Results are shown in Table 2. Note that shaded sections indicate unmeasured.

Area ratios (S2) of the lead-out region segregation phase 185 with respect to an area of each field of view described above were obtained, and an average value thereof was calculated.

<S1/S2>

S1/S2 was calculated from S1 and S2 calculated as described above. Results are shown in Table 2. Note that shaded sections indicate unmeasured.

<Grain Size of Dielectric Grains>

The element body 4 was cut in the laminating direction of the inner dielectric layers 10 and the internal electrode layers 12, an average area of the dielectric grains was measured in the cross section, and a diameter thereof was calculated as the circle equivalent diameter. Results are shown in Table 3.

<Specific Dielectric Constant (c)>

A capacitance of the capacitor sample is measured with a digital LCR meter (4278A manufactured by Agilent Technologies) under conditions of a reference temperature of 20° C., a frequency of 1 kHz, and an input signal level (measurement voltage) of 1.0 Vrms, and the specific dielectric constant (no unit) was calculated. Results are shown in Table 3.

<±PTV Defect Rate Index>

A defect rate when a voltage higher than a rated voltage was applied to all the capacitor samples in a manufacture lot was defined as a ±PTV defect rate. The ±PTV defect rate was evaluated by an index when Comparative Example 2 was set to 100. Results are shown in Table 3.

TABLE 1

| Sample No. | Main component Amount [molar part] | A/B ratio | Oxides of rare earth element ($R_2O_3$) | | | | | MgO | MnO | $Cr_2O_3$ | $V_2O_5$ | BaO | CaO | $SiO_2$ | MgO/ $SiO_2$ | MgO/ MnO | MgO/ $Cr_2O_3$ |
|---|---|---|---|---|---|---|---|---|---|---|---|---|---|---|---|---|---|
| | | | $Y_2O_3$ | $Dy_2O_3$ | $Ho_2O_3$ | $Yb_2O_3$ | Total $R_2O_3$ | | | | | | | | | | |
| Example 1 | 100 | 1.000 | 0.20 | 0.20 | 0.00 | 0.00 | 0.4 | 1.25 | 0.14 | 0.00 | 0.03 | 0.16 | 0.11 | 0.27 | 4.63 | 8.93 | — |
| Example 2 | 100 | 0.997 | 0.25 | 0.25 | 0.00 | 0.00 | 0.5 | 1.75 | 0.14 | 0.00 | 0.05 | 0.36 | 0.26 | 0.62 | 2.82 | 12.50 | — |
| Example 3 | 100 | 1.000 | 0.00 | 1.12 | 0.40 | 0.35 | 1.9 | 1.00 | 0.17 | 0.00 | 0.07 | 1.00 | 0.00 | 0.97 | 1.03 | 5.88 | — |
| Comparative Example 1 | 100 | 0.998 | 0.50 | 0.00 | 0.00 | 0.00 | 0.5 | 1.91 | 0.00 | 0.20 | 0.06 | 0.32 | 0.24 | 0.56 | 3.41 | — | 9.55 |
| Comparative Example 2 | 100 | 0.995 | 0.50 | 0.00 | 0.00 | 0.00 | 0.5 | 1.91 | 0.00 | 0.20 | 0.06 | 0.32 | 0.24 | 0.56 | 3.41 | — | 9.55 |

TABLE 2

| Sample No. | Composition of segregation phase [molar part] | | | | | Firing temperature increase rate [° C./hr] | Annealing conditions |
|---|---|---|---|---|---|---|---|
| | MgO | NiO | MnO | $Cr_2O_3$ | $SiO_2$ | | |
| Example 1 | 63.6 | 35.8 | 0.6 | 0 | 0 | 500 | First-stage |
| Example 2 | 99.4 | 0 | 0.6 | 0 | 0 | 2000 | Second-stage |
| Example 3 | 98.6 | 0 | 1.4 | 0 | 0 | 550 | First-stage |
| Comparative Example 1 | 84.8 | 0 | 0 | 15.2 | 0 | 400 | Second-stage |
| Comparative Example 2 | 83.6 | 0 | 0 | 16.4 | 0 | 400 | |

| Sample No. | Capacitance region | | | | | Lead-out region | | | | | S1/S2 |
|---|---|---|---|---|---|---|---|---|---|---|---|
| | DL/DS MAX | DL/DS MIN | DL [μm] | Td [μm] | Td/DL | Td/Da | DL/DS MAX | DL/DS MIN | DL [μm] | Td [μm] | Td/DL | Td/Da | |
| Example 1 | 1.24 | 1.05 | 0.43 | 2.03 | 4.72 | 0.219 | 1.53 | 1.05 | 0.49 | 4.87 | 9.94 | 0.406 | 0.191 |
| Example 2 | 1.39 | 1.02 | 0.36 | 0.53 | 1.47 | 0.219 | 1.54 | 1.10 | 0.27 | 1.80 | 6.67 | 0.129 | 0.934 |
| Example 3 | 1.19 | 1.19 | 0.81 | 2.27 | 2.80 | 0.805 | 1.48 | 1.48 | 0.54 | 5.20 | 9.63 | 0.925 | 0.368 |
| Comparative Example 1 | 20.96 | 2.00 | 6.77 | 1.20 | 0.18 | | 6.28 | 2.12 | 4.53 | 3.55 | 0.78 | | |
| Comparative Example 2 | | | | | | | | | | | | | |

TABLE 3

| Sample No. | Grain size [μm] of dielectric grains | ε | ±PTV defect rate index |
|---|---|---|---|
| Example 1 | 0.36 | 6100 | 76 |
| Example 2 | 0.24 | 4200 | 57 |
| Example 3 | 0.19 | 2750 | 8 |
| Comparative Example 1 | 0.30 | 4100 | 112 |
| Comparative Example 2 | 0.42 | 5700 | 100 |

FIG. 5 is a graph in which an x-axis represents the grain size [μm] of the dielectric grains and a y-axis represents the specific dielectric constant based on Table 3. Solid square indicates Example 1, solid rhombus indicates Example 2, solid triangle indicates Example 3, cross indicates Comparative Example 1, and plus sign indicates Comparative Example 2. A straight line L satisfies y=20000x−1500.

From Tables 1 to 3 and FIG. 5, it could be confirmed that the molar ratio of ($MgO/SiO_2$) in the dielectric layer is 1 to 5; the molar ratio of (MgO/MnO) in the dielectric layer is 5 to 13; and assuming that the total amount of MgO, NiO, MnO, $Cr_2O_3$, and $SiO_2$ in the segregation phase is 100 molar parts, when the amount of MgO in the segregation phase is 63.0 molar parts to 99.5 molar parts and the amount of MnO in the segregation phase is 0.5 molar parts to 12.6 molar parts (Examples 1 to 3), Examples 1 to 3 are located on the left side of the straight line L in FIG. 5, so that the specific dielectric constant can be improved while reducing the grain size of the dielectric grains.

From Tables 1 to 3, it could be confirmed that the molar ratio of ($MgO/SiO_2$) in the dielectric layer is 1 to 5; the molar ratio of (MgO/MnO) in the dielectric layer is 5 to 13; and assuming that the total amount of MgO, NiO, MnO, $Cr_2O_3$, and $SiO_2$ in the segregation phase is 100 molar parts, when the amount of MgO in the segregation phase is 63.0 molar parts to 99.5 molar parts and the amount of MnO in the segregation phase is 0.5 molar parts to 12.6 molar parts (Examples 1 to 3), the ±PTV defect rate index was lower than when the amount of MnO in the segregation phase was 0 molar part (Comparative Examples 1 and 2), so that the reliability is higher.

NUMERICAL REFERENCES

2 multilayer ceramic capacitor (capacitor sample)
4 element body
6A, 6B external electrode
10 inner dielectric layer
11 exterior region
12 internal electrode layer
121 discontinuous portion
124 capacitance region internal electrode layer
125A, 125B lead-out region internal electrode layer
13 interior region
14 capacitance region
15A, 15B lead-out region
18 segregation phase
184 capacitance region segregation phase
185 lead-out region segregation phase

What is claimed is:
1. A multilayer electronic device, comprising:
an element body including alternately stacked dielectric layers and internal electrode layers, wherein
the dielectric layers contain a main component represented by a formula of $ABO_3$ and a sub-component,
A site of $ABO_3$ contains at least one selected from the group consisting of Ba, Ca and Sr,
B site of $ABO_3$ contains at least one selected from the group consisting of Ti and Zr,
the sub-component includes MgO, $SiO_2$ and MnO,
a molar ratio ($MgO/SiO_2$) in the dielectric layer is 1 to 5,
a molar ratio (MgO/MnO) in the dielectric layer is 5 to 13,
the element body contains a segregation phase, an amount of MgO in the segregation phase is 63.0 to 99.5 molar parts, and an amount of MnO in the segregation phase is 0.5 to 12.6 molar parts assuming that a total amount of MgO, NiO, MnO, $Cr_2O_3$, and $SiO_2$ in the segregation phase is 100 molar parts.

2. The multilayer electronic device according to claim 1, wherein

DL and DS satisfy a relation of 1<DL/DS<2, assuming that a long grain size of the segregation phase is DL, and a short grain size of the segregation phase is DS.

3. The multilayer electronic device according to claim 1, wherein

Td/DL is greater than 1.4, assuming that a thickness of the dielectric layer is Td, and a long grain size of the segregation phase is DL.

4. The multilayer electronic device according to claim 1, wherein an amount of NiO in the segregation phase is 0 to 36 molar parts, assuming that the total amount of MgO, NiO, MnO, $Cr_2O_3$, and $SiO_2$ in the segregation phase is 100 molar parts.

5. The multilayer electronic device according to claim 1, wherein an amount of $Cr_2O_3$ in the segregation phase is 0 to 0.1 molar part, assuming that the total amount of MgO, NiO, MnO, $Cr_2O_3$, and $SiO_2$ in the segregation phase is 100 molar parts.

6. The multilayer electronic device according to claim 1, wherein an amount of $SiO_2$ in the segregation phase is 0 to 0.01 molar part, assuming that the total amount of MgO, NiO, MnO, $Cr_2O_3$, and $SiO_2$ in the segregation phase is 100 molar parts.

7. The multilayer electronic device according to claim 1, wherein the sub-component includes $R_2O_3$, an amount of $R_2O_3$ in the dielectric layer is 0.4 to 2.0 molar part, and R is at least one selected from the group consisting of Y, Dy, Ho and Yb, assuming that an amount of the main component in the dielectric layer is 100 molar parts.

8. The multilayer electronic device according to claim 1, wherein an amount of MgO in the dielectric layer is 0.5 to 2.0 molar parts, assuming that an amount of the main component in the dielectric layer is 100 molar parts.

9. The multilayer electronic device according to claim 1, wherein an amount of MnO in the dielectric layer is 0.01 to 0.20 molar parts, assuming that an amount of the main component in the dielectric layer is 100 molar parts.

10. The multilayer electronic device according to claim 1, wherein an amount of $SiO_2$ in the dielectric layer is 0.18 to 2.95 molar parts, assuming that an amount of the main component in the dielectric layer is 100 molar parts.

11. The multilayer electronic device according to claim 1, wherein the segregation phase has a circle equivalent diameter (Da) of 0.12 μm to 1.0 μm.

12. The multilayer electronic device according to claim 1, wherein

S1/S2 is less than 1, assuming that the segregation phase located in a capacitance region that contributes to capacitance is a capacitance region segregation phase, the segregation phase located in a lead-out region that does not contribute to capacitance is a lead-out region segregation phase, an area ratio of the capacitance region segregation phase in a predetermined range of the capacitance region is S1, and an area ratio of the lead-out region segregation phase in a predetermined range of the lead-out region is S2.

* * * * *